(12) United States Patent
Kuo

(10) Patent No.: US 9,303,967 B2
(45) Date of Patent: Apr. 5, 2016

(54) END TANG STRUCTURE OF ROLL-UP TAPE MEASURE

(71) Applicant: Top Long Industrial Co., Ltd., New Taipei (TW)

(72) Inventor: Shao-Fan Kuo, New Taipei (TW)

(73) Assignee: Top Long Industrial Co., Ltd., New Taipei (TW)

( * ) Notice: Subject to any disclaimer, the term of this patent is extended or adjusted under 35 U.S.C. 154(b) by 132 days.

(21) Appl. No.: 14/185,932

(22) Filed: Feb. 21, 2014

(65) Prior Publication Data
US 2015/0241192 A1    Aug. 27, 2015

(51) Int. Cl.
*G01B 3/10*    (2006.01)

(52) U.S. Cl.
CPC ............ *G01B 3/1056* (2013.01); *G01B 3/1071* (2013.01)

(58) Field of Classification Search
CPC ............................ G01B 3/1056; G01B 3/1071
USPC ............................ 33/758, 759, 760, 768, 770
See application file for complete search history.

(56) References Cited

U.S. PATENT DOCUMENTS

| 6,442,863 | B1 * | 9/2002 | Poineau ............... | G01B 3/1071 33/755 |
| 7,669,347 | B1 * | 3/2010 | Huang ................. | G01B 3/1056 33/758 |
| 7,854,074 | B2 * | 12/2010 | Zhou .................... | G01B 3/1056 33/758 |
| 8,601,710 | B2 * | 12/2013 | Huang ................. | G01B 3/1056 33/758 |
| 2007/0074418 | A1 * | 4/2007 | Critelli ................. | G01B 3/1056 33/758 |
| 2009/0288307 | A1 * | 11/2009 | Zhou .................... | G01B 3/1056 33/758 |
| 2013/0298417 | A1 * | 11/2013 | Huang ................. | G01B 3/1056 33/758 |
| 2014/0007444 | A1 * | 1/2014 | Murray ................ | G01B 3/1071 33/770 |

* cited by examiner

*Primary Examiner* — Yaritza Guadalupe-McCall
(74) *Attorney, Agent, or Firm* — Leong C. Lei

(57) ABSTRACT

A structure of a tang of a roll-up tape measure includes a tang base and a tang plate formed at one side of the tang base. The tang base includes a plurality of tang coupling slots formed in one side thereof for coupling a measure ribbon and for positional adjustment of a reference point and also includes a tang hook formed at one end thereof. The tang hook includes a first hook section and a second hook section extending in opposite direction. The tang plate includes a receiving slot formed in one side thereof. The receiving slot receives and retains a magnetic element. The receiving slot includes, at one side thereof, at least one magnetic element for constraining and preventing the constraint stop from detachment.

8 Claims, 7 Drawing Sheets

END TANG STRUCTURE OF ROLL-UP TAPE MEASURE

TECHNICAL FIELD OF THE INVENTION

The present invention generally relates to an improved error-proof and fixing structure of an end tang of roll-up tape measure, and more particularly to an end tang structure of a roll-up tape measure that has a simple structure, a reduced cost, and high precision of measurement.

DESCRIPTION OF THE PRIOR ART

Tape measures are a convenient measurement tool for measuring length. The length of an object to be measured can be measured with a tape measure by having an end tang of the tape measure engaging the object. The data of length so measured can be used in the subsequent operations.

The tape measures have been widely used in decoration and construction works. By having the end tang engaging an object and observing the measurement markings provided on the tape, a length can be measured. There are generally two ways of setting the end tang in contact with the object. The first one is to have the end tang hooked into and temporarily attached to the object and the second one is to have the end tang push against the object. There are drawbacks of the end tang of a conventional tape measure, such as:

(1) In the hooking mode, due to the inherent thickness of the tang, there is always an error when used in the hooking mode (for the accurate length must be calculated through addition/subtraction of the thickness of the tang). This leads to inconvenience in the subsequent operations. Further, some of the tape measures have a single-side tang, which makes the use of the tape subjected to direction constraint and makes it not usable in certain applications.

(2) In the pushing mode, the thickness of the tang also causes error of measurement. Further, it may not be possible to ensure that the tang is in firm and sound pushing contact with a surface pushed thereby. This also causes errors.

It is thus desired to provide an improvement to overcome the above problems.

SUMMARY OF THE INVENTION

The primary object of the present invention is that a tang base is provided with tang coupling slots for compensating errors resulting from the thickness thereof; a tang hook is structured to enable hooking in both sides; and a tang plate is formed to receive a magnetic element therein for magnetically attaching to a surface that is pushed thereby, whereby with such arrangements, the problems of the prior art tang hook of a tape measure that hooking can be achieved at only one side, errors of measurement may result from thickness, and pushing cannot be performed in a stable and firm manner can be overcome so as to achieve the practical advantages of structure simplification, cost reduction, and high preciseness of measurement.

The structure of an end tang of a tape measure according to the present invention comprises, structurally, a tang base and a tang plate coupled to the tang base. The tang base comprises a plurality of tang coupling slots formed in one side thereof for coupling with a measure ribbon and also for positional adjustment of a reference point and has an opposite end that forms a tang hook. The tang hook comprises a first hook section and a second hook section extending in opposite directions. The tang plate comprises a receiving slot formed in one side thereof. The receiving slot receives and retains therein a magnetic element. The receiving slot comprises, at one side thereof, at least one constraint stop for constraining and preventing the magnetic element from detachment.

With such an arrangement, to be set in position through hooking or pushing, the tang base undergoes slight displacement to compensate errors resulting from the thickness of the tang base. The first hook section and the second hook section of the tang hook allow hooking to be carried out more convenient. Further, the magnetic element may magnetically attach to a pushed surface in order to eliminate errors of measurement. As such, advantages of simple structure, reduced cost, and high preciseness of measurement can be achieved.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
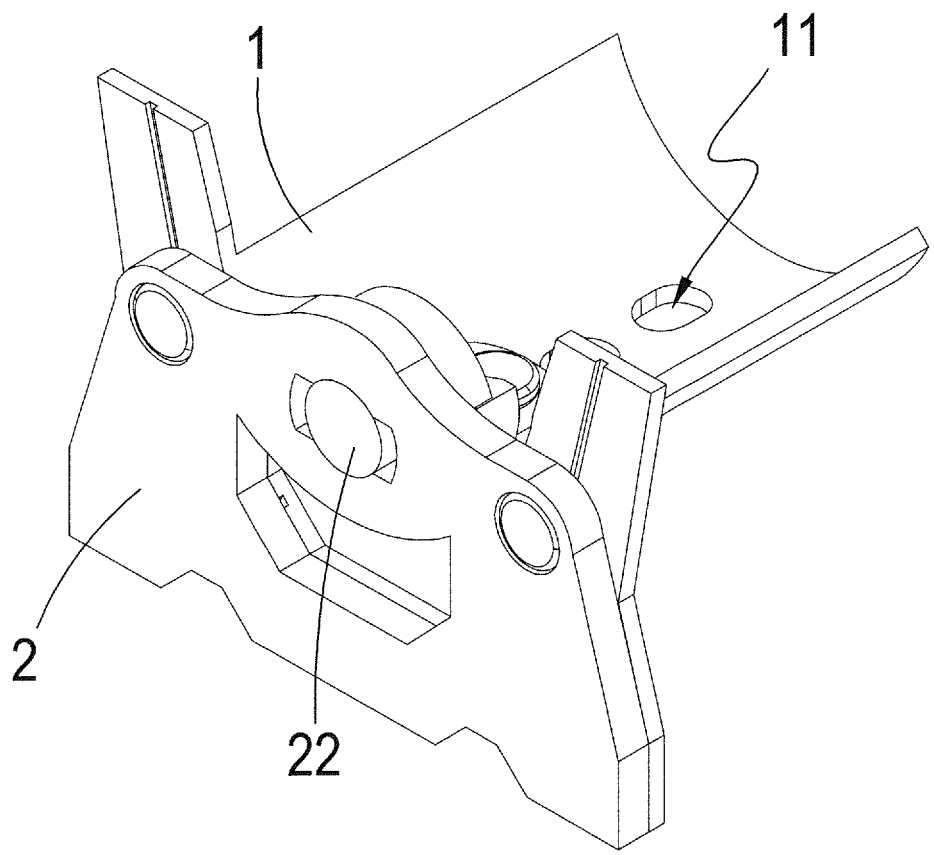
FIG. 1 is a perspective view showing a preferred embodiment of the present invention.
Figure 2:
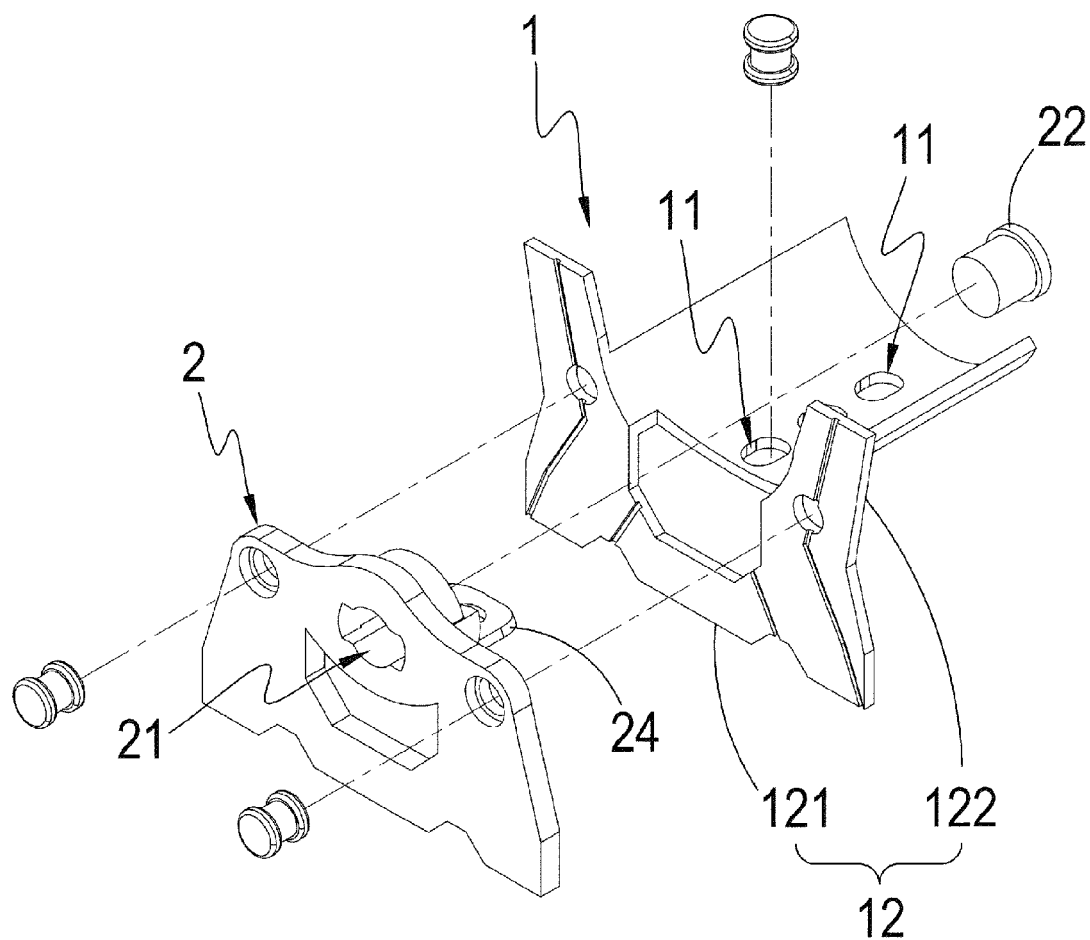
FIG. 2 is an exploded view of the preferred embodiment of the present invention.
Figure 3:
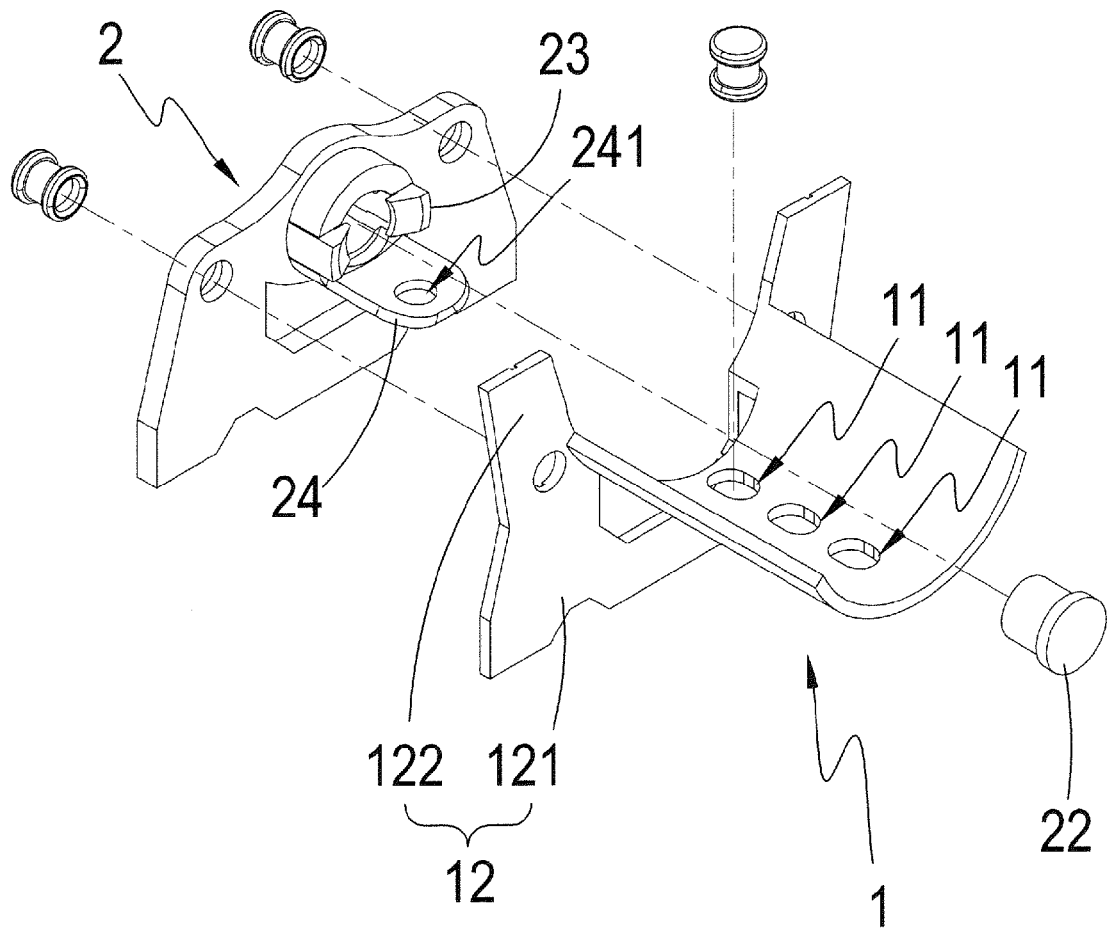
FIG. 3 is another exploded view of the preferred embodiment of the present invention taken from another viewing angle.
Figure 4:
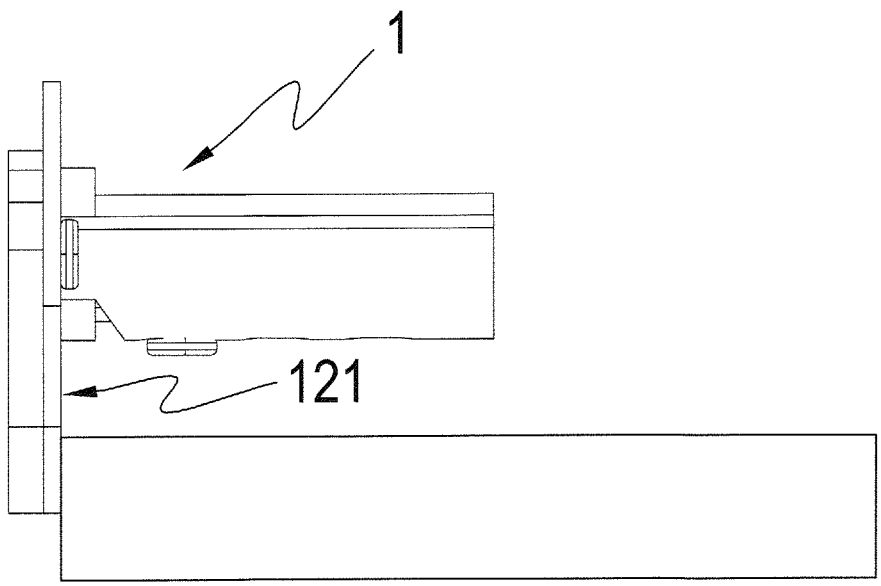
FIG. 4 is a schematic view illustrating uses of the preferred embodiment of the present invention.
Figure 4:
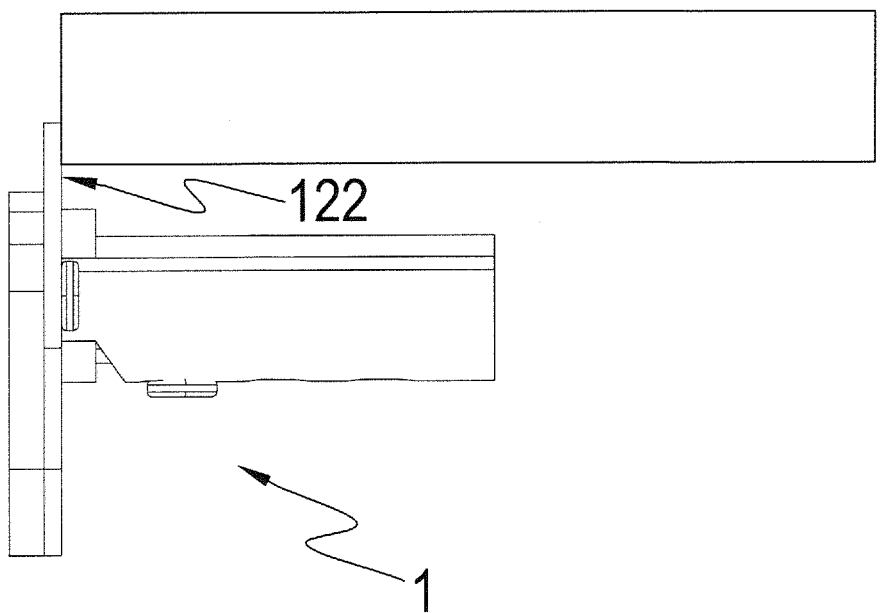
Figure 5:
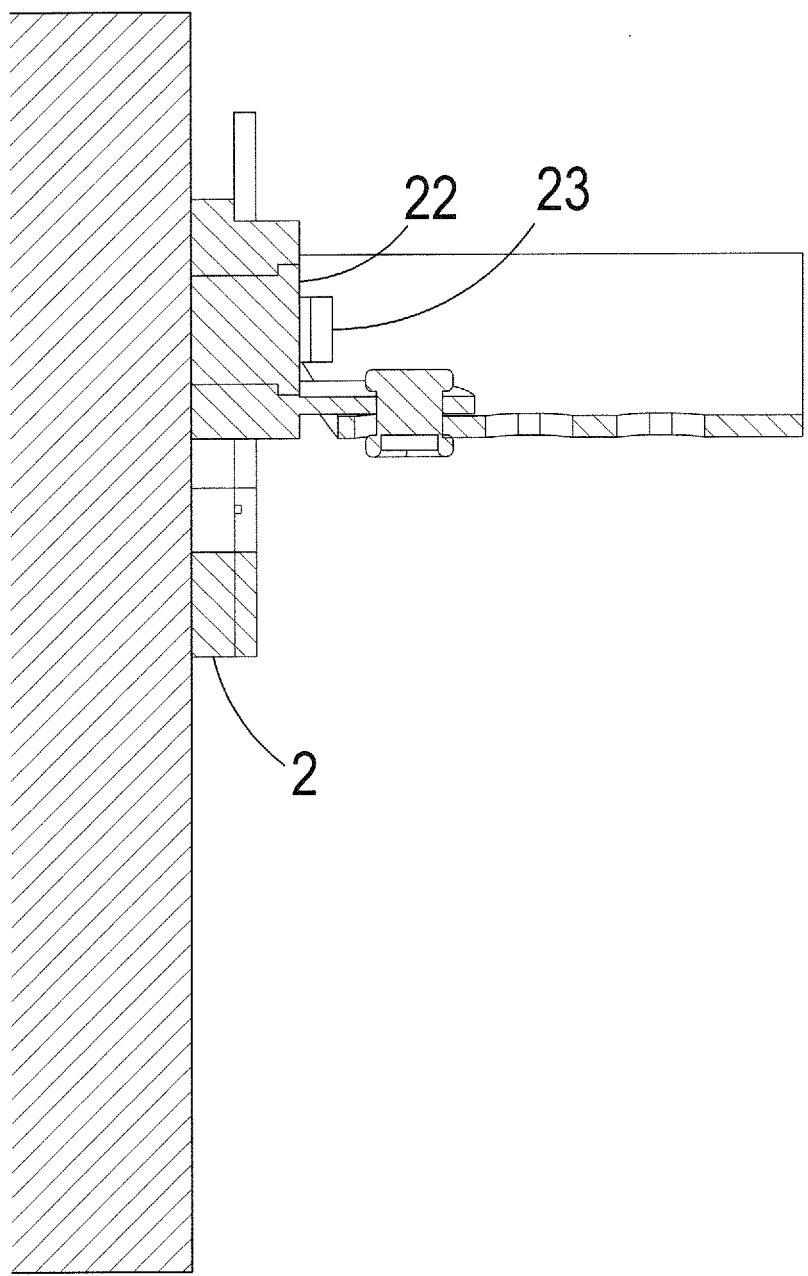
FIG. 5 is a schematic view illustrating another use of the preferred embodiment of the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-7, which shows a preferred embodiment of the present invention, the drawings clearly show the present invention comprises:

a tang base 1, wherein the tang base 1 comprises a plurality of tang coupling slots 11 formed in one side thereof for coupling with a measure ribbon and also for positional adjustment of a reference point, the tang base 1 having an end that is distant from the tang coupling slots 11 and forms a tang hook 12, the tang hook 12 comprising a first hook section 121 and a second hook section 122 extending in opposite directions; and a tang plate 2 coupled to the tang base 1, wherein the tang plate 2 comprises a receiving slot 21 formed in one side thereof, the receiving slot 21 receiving therein a magnetic element 22, the receiving slot 21 comprising at least one constraint stop 23 formed at one side thereof to constraint and prevent the magnetic element 22 from detachment.

The tang base 1 and the tang plate 2 are coupled to each other through riveting or ultrasonic welding. The tang base 1 is made of a metallic material and the tang plate 2 is made of a plastic material. The tang plate 2 further comprises a plate fixing section 24 extending therefrom to strengthen the coupling thereof with the tang base 1. The plate fixing section 24 comprises a fixing hole 241 formed therein. The fixing hole 241 is arranged to correspond to the tang coupling slots 11. The fixing hole 241 is coupled through riveting or ultrasonic welding to the tang coupling slot 11.

The magnetic element 22 is received, in a rotatable or fixed manner, in the receiving slot 21. For a rotatable arrangement, where the magnetic element 22 is rotatably arranged in the receiving slot 21, the magnetic element 22 is made in the form of a two-layered cylindrical configuration or a conic configuration and the receiving slot 21 is of a configuration corresponding to that of the magnetic element 22; and for a fixed arrangement, where the magnetic element 22 is securely fixed in the receiving slot 21, the magnetic element 22 is made in the form of a non-circular configuration and the receiving slot 21 is of a configuration corresponding to that of the magnetic element 22.

Figure 6:
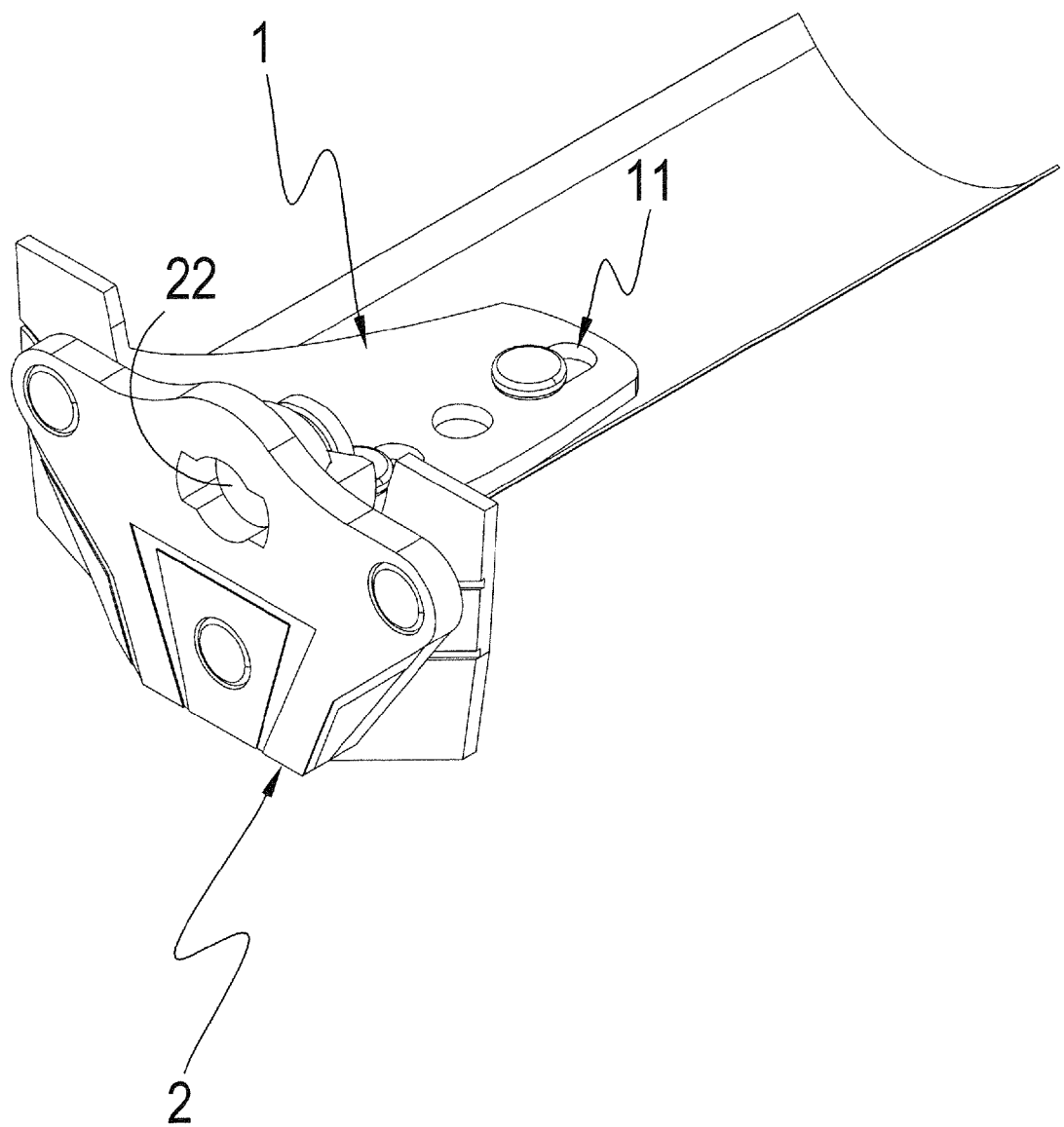
FIG. 6 is a perspective view showing another form of a tang base and a tang hook coupled to each other.
Figure 7:
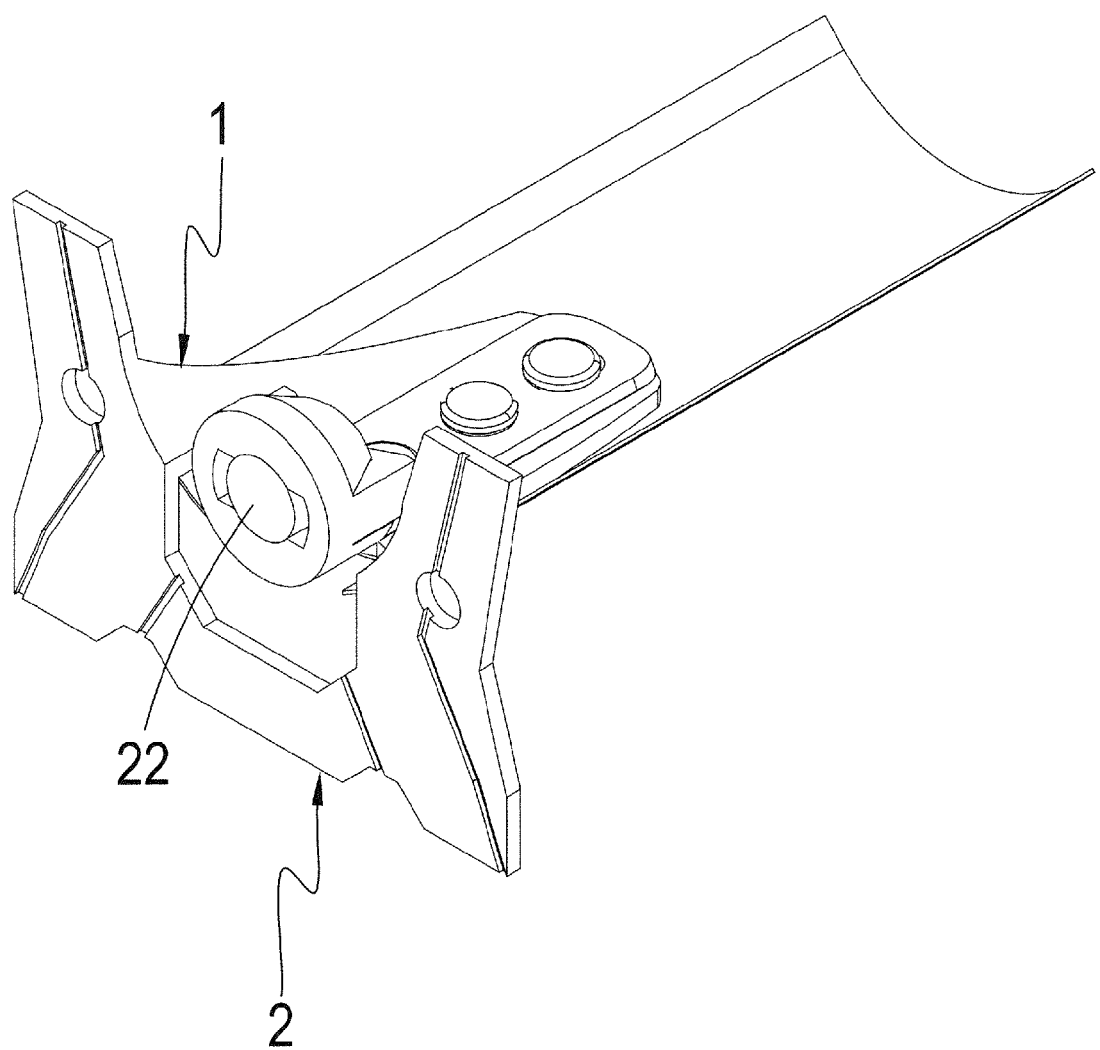
FIG. 7 is a perspective view showing a further form of a tang base and a tang hook coupled to each other.

Referring to all the drawings, the magnetic element 22 of the present invention as illustrated in the drawings is provided for the rotatable arrangement, whereby to use, measurement can be carried out by setting the tang hook 12 in a hooking or pushing manner. When the hooking manner is taken, the first hook section 121 or the second hook section 122 can be used to achieve an efficient operation for fixing on opposite sides. Since the tang base 1 has a certain thickness, the measurement made with a tape measure incorporating the tang may have an error, the arrangement of the tang coupling slots 11 allows for alleviating the influence caused by the error resulting from the thickness of the tang base 1. When the pushing manner is taken, the magnetic element 22 can be used to apply an attraction force to a pushed surface that is magnetic in order to ensure secure and firm engagement between the tang base 1 and the pushed surface. With the above description, it can be readily understood that the arrangement of the tang coupling slots 11 can ensure the achievement of advantages of easy use and high precision measurement. The tang plate 2 is coupled, via riveting or ultrasonic welding, to the tang base 1 and the magnetic element 22 is retained in the receiving slot 21 and is prevented by the constraint stop 23 from detaching from the magnetic element 22, whereby the present invention realizes an advantage of structure simplification and thus achieving the purposes of reducing cost. Further, the mating arrangement between the fixing hole 241 of the plate fixing section 24 and the tang coupling slots 11 helps enhance the coupling between the tang base 1 and the tang plate 2. Referring to FIGS. 6 and 7, two different forms of the tang base 1 and the tang plate 2 are provided. The two forms comprise modifications made only on the outside appearance and the functionality and inventive idea of the present invention are preserved and are the same as the previous description, so that repeated description will be omitted.

Thus, the technical features that the structure of an end tang of a roll-up tape measure according to the present invention overcomes the drawbacks of the prior art are as follows:

(1) Tang coupling slots 11 are provided for improving measurement errors.

(2) A first hook section 121 and a second hook section 122 are simultaneously provided for easy and efficient use.

(3) A constraint stop 23 is provided for constraining and positioning a magnetic element 22 so as to achieve the advantages of structure simplification and cost reduction.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A tang of a tape measure, comprising:
a tang base, wherein the tang base comprises a plurality of tang coupling slots formed in one side thereof for coupling with a measure ribbon and for positional adjustment of a reference point, the tang base having an end that is distant from the tang coupling slots and forms a tang hook, the tang hook comprising a first hook section and a second hook section extending in opposite directions; and
a tang plate coupled to the tang base, wherein the tang plate comprises a receiving slot formed in one side thereof, the receiving slot receiving therein a magnetic element, the receiving slot comprising at least one constraint stop formed at one side thereof to constraint and prevent the magnetic element from detachment;
wherein the tang plate is coupled to the tang base in such a way that the magnetic element that is received in the receiving slot is located between the first hook section and a second hook section and the first and second hook sections extend away from the magnetic element in directions opposite to each other.

2. The tang of a tape measure according to claim 1, wherein the tang base and the tang plate are coupled to each other through one of riveting and ultrasonic welding.

3. The tang of a tape measure according to claim 1, wherein the magnetic element is received in the receiving slot in one of a rotatable arrangement and a fixed arrangement.

4. The tang of a tape measure according to claim 3, wherein in the rotatable arrangement, where the magnetic element is rotatably received in the receiving slot, the magnetic element has a form of a two-layered cylindrical configuration or a conic configuration and the receiving slot is of a configuration corresponding to that of the magnetic element.

5. The tang of a tape measure according to claim 3, wherein in the fixed arrangement, where the magnetic element is securely fixed in the receiving slot, the magnetic element has a form of a non-circular configuration and the receiving slot is of a configuration corresponding to that of the magnetic element.

6. The tang of a tape measure according to claim 1, wherein the tang base is made of a metallic material and the tang plate is made of a plastic material.

7. The tang of a tape measure according to claim 1, wherein the tang plate comprises a plate fixing section extending therefrom to strengthen the coupling thereof with the tang base and the plate fixing section comprises fixing hole formed therein, the fixing hole corresponding to the tang coupling slots.

8. The tang of a tape measure according to claim 7, wherein the fixing hole is coupled, via one of riveting and ultrasonic welding, to the tang coupling slots.

\* \* \* \* \*